US012175525B2

(12) United States Patent
Arnold et al.

(10) Patent No.: US 12,175,525 B2
(45) Date of Patent: Dec. 24, 2024

(54) METHOD, COMPUTER PROGRAM PRODUCT, AND SYSTEM FOR ACCOUNTING FOR VARIABLE DIMENSIONS OF CONTENT ITEMS WHEN POSITIONING CONTENT ITEMS IN A USER INTERFACE HAVING SLOTS FOR DISPLAYING CONTENT ITEMS

(71) Applicant: Maplebear Inc., San Francisco, CA (US)

(72) Inventors: Jeffrey Bernard Arnold, Oakland, CA (US); Rob Donnelly, San Francisco, CA (US); Sumit Garg, Saratoga, CA (US); Jonathan Gu, San Francisco, CA (US); Bill Lundberg, Seattle, WA (US); David Pal, New York, NY (US); Sharath Rao Karikurve, Berkeley, CA (US); Peng Qi, Menlo Park, CA (US)

(73) Assignee: Maplebear Inc., San Francisco, CA (US)

( * ) Notice: Subject to any disclaimer, the term of this patent is extended or adjusted under 35 U.S.C. 154(b) by 189 days.

(21) Appl. No.: 17/493,150

(22) Filed: Oct. 4, 2021

(65) Prior Publication Data
US 2023/0109298 A1   Apr. 6, 2023

(51) Int. Cl.
G06Q 30/0601 (2023.01)
G06F 9/451 (2018.01)
G06Q 30/02 (2023.01)

(52) U.S. Cl.
CPC ......... *G06Q 30/0643* (2013.01); *G06F 9/451* (2018.02); *G06Q 30/02* (2013.01); *G06Q 30/0613* (2013.01); *G06Q 30/0627* (2013.01)

(58) Field of Classification Search
CPC ............ G06F 9/451; G06Q 10/087; G06Q 30/0601–0643; G06Q 30/08
See application file for complete search history.

(56) References Cited

U.S. PATENT DOCUMENTS

2006/0095336 A1 *  5/2006  Heckerman ............ G06Q 40/04
                                                    705/26.3
2010/0257058 A1 * 10/2010  Karidi ................... G06Q 30/02
                                                    705/26.1

(Continued)

OTHER PUBLICATIONS

Chen, J. et. al. "An Economic Analysis of Online Advertising Using Behavioral Targeting." MIS Quarterly, vol. 38, No. 2, pp. 429-A7. JSTOR, https://www.jstor.org/stable/26634933. Accessed Jul. 27, 2023. (Year: 2014).*

(Continued)

*Primary Examiner* — Allison G Wood
*Assistant Examiner* — Katherine A Barlow
(74) *Attorney, Agent, or Firm* — Fenwick & West LLP

(57) ABSTRACT

An online concierge system includes sponsored content items in an interface including different slots for displaying content items. A sponsored content item may be displayed in a single slot or in multiple adjacent slots. The online concierge system determines a content score for various sponsored content items indicating a likelihood of a user interacting with a sponsored content item and a position bias for slots in the interface indicating a likelihood of the user interacting with a slot independent of content in the slot. Position biases are different dependent on a number of slots in which a content item is displayed. The online concierge system generates a graph identifying potential placements of sponsored content items in slots by selecting content items in an order according to their content scores. Sponsored content items are positioned in slots according to a path through the graph that has the highest overall expected value.

20 Claims, 6 Drawing Sheets

(56) References Cited

U.S. PATENT DOCUMENTS

| | | | | |
|---|---|---|---|---|
| 2015/0046515 A1* | 2/2015 | Pei | ............................ | H04L 67/01 |
| | | | | 709/203 |
| 2016/0142747 A1* | 5/2016 | He | ......................... | H04N 5/2723 |
| | | | | 725/32 |
| 2017/0357717 A1* | 12/2017 | Hughes | ................... | G06F 40/186 |
| 2018/0253800 A1* | 9/2018 | Feldman | ................. | G06Q 50/01 |
| 2019/0102806 A1* | 4/2019 | Doshi | ................... | H04N 21/812 |

OTHER PUBLICATIONS

Hassija, V. et. al. "A Parking Slot Allocation Framework Based on Virtual Voting and Adaptive Pricing Algorithm," in IEEE Transactions on Vehicular Technology, vol. 69, No. 6, pp. 5945-5957, doi: 10.1109/TVT.2020.2979637. (Year: 2020).*

Perlich, C., et. al. "Bid optimizing and inventory scoring in targeted online advertising." In Proceedings of the 18th ACM SIGKDD international conference on Knowledge discovery and data mining (KDD '12). Association for Computing Machinery, New York, NY, USA, 804-812. (Year: 2012).*

* cited by examiner

400

| Slot 405A | Slot 405B | Slot 405C |
| Slot 405D | Slot 405E | Slot 405F |
| Slot 405G | Slot 405H | Slot 405I |

METHOD, COMPUTER PROGRAM PRODUCT, AND SYSTEM FOR ACCOUNTING FOR VARIABLE DIMENSIONS OF CONTENT ITEMS WHEN POSITIONING CONTENT ITEMS IN A USER INTERFACE HAVING SLOTS FOR DISPLAYING CONTENT ITEMS

BACKGROUND

This disclosure relates generally to positioning content items for display in slots of a user interface, and more specifically accounting for variable dimensions of content items and predicted amounts of interaction with content items when positioning the content items in the user interface.

In current online concierge systems, shoppers (or "pickers") fulfill orders at a physical warehouse, such as a retailer, on behalf of users as part of an online shopping concierge service. An online concierge system provides an interface to a user identifying items offered by a physical warehouse and receives selections of one or more items for an order from the user. In current online concierge systems, the shoppers may be sent to various warehouses with instructions to fulfill orders for items, and the shoppers then find the items included in the user order in a warehouse.

Online concierge systems often identify items available from a warehouse to users through various user interfaces. In various configurations, an interface maintains different positions that each display a representation or other information describing an item available from a warehouse via the online concierge system. For example, in response to receiving a search query from a user, the online concierge system displays an interface to the user including items at least partially matching the search query in different positions of the interface. As an example, the interface displays information identifying different items in different locations of a grid, in different columns, or in different rows.

Conventionally, positions of an interface displaying information describing items are equally sized. Hence, information describing different products is displayed with common dimensions in conventional online concierge systems. However, it can be beneficial to allocate an increased amount of an interface to displaying information describing certain items. Increasing an amount of the interface that displays information describing an item increases a likelihood of the user selecting the information describing the item or purchasing the item. However, increasing an amount of the interface displaying information describing an item displaces information describing other items, which may reduce likelihoods of the user selecting information describing the other items. This may decrease overall selection of items or interaction with the online concierge system by users. As users increasingly access online concierge systems from client devices with limited display areas, such as mobile devices, failing to account for both user interaction with information describing an item displayed in a larger amount of an interface and effects of displacing information describing other items inefficiently uses limited display area of many devices, which may increase an amount of user interaction with the online concierge system to identify relevant items, causing a decrease in overall interaction with the online concierge system by users.

SUMMARY

An online concierge system generates one or more interfaces displaying content items to its users. Content items displayed by the interface identify different items available for purchase from one or more warehouses. In various embodiments, an interface includes multiple slots, with each slot specifying a region in which a content item is displayed. Each slot has common dimensions in various embodiments, providing a uniform height and width for display of different content items.

Content items obtained by the online concierge system have sizing information in various embodiments, with sizing information of a content item specifying a number of adjacent slots of the interface for displaying the content item. A content item displayed in only a single slot is a standard content item, while a content item displayed in multiple adjacent slots is an extended content item. Additionally, certain content items include a bid amount specifying an amount of compensation the online concierge system receives in exchange for displaying the content item. A content item including a bid amount is a sponsored content item, and the online concierge system may receive the compensation specified by the bid amount in response to displaying the sponsored content item to a user or in response to the user performing a specific interaction with the online concierge system after the sponsored content item is displayed to the user.

When the online concierge system receives a request for content from a user, the online concierge system determines a content score that is unrelated to a position in an interface where the content item having the specific type is displayed. For example, the online concierge system determines a content score for each sponsored content item. In various embodiments, the online concierge system applies a trained interaction model to a combination of the user and a content item to determine the content score for the content item. For example, the content score for the content item is a probability of the user selecting the content item determined from attributes of the content item and characteristics of the user. In other embodiments, the content score for the content item is a probability of the user performing a specific interaction with the online concierge system after the content item is displayed to the user. Example specific interactions include: including an item corresponding to the content item in an order, requesting additional information about the item corresponding to the content item from the online concierge system, or any other suitable interaction. The online concierge system maintains different trained interaction models for different specific interactions and applies a trained interaction model for a particular specific interaction to combinations of the user and sponsored content items (or content items having another specific type) after receiving the request for content from the user. In various embodiments, the online concierge system determines content scores for a subset of the content items determined from the received request. For example, the subset of the content items includes content items corresponding to items having information (e.g., names, descriptions) that at least partially match information included in the request (e.g., one or more search terms included in the request).

The interface used by the online concierge system to display content items comprises multiple slots, with each slot corresponding to different locations in a display device displaying the interface and each slot having dimensions specifying a size of a content item displayed using the slot. A slot in which a content item is displayed affects a likelihood of a user selecting or viewing the content item. To account for effects of a slot of the interface in which a content item is displayed, the online concierge system determines a position bias for each slot of the interface. The position bias for a slot provides a measure of a user's likelihood of selecting a content item displayed in the slot, independent of attributes of the content item. Thus, the position bias for a slot provides a measure of the user's likelihood of interacting with the slot. In various embodiments, the online concierge system determines the position bias for a slot from interactions by multiple users with interfaces displayed by the online concierge system to the user. For example, when a user selects a content item, the online concierge system 102 determines a slot in an interface that displayed the content item and determines frequencies or rates of interactions for which different slots are determined, allowing the position bias of a slot to account for interactions by users with different slots. The position bias of a slot corresponds to interaction with standard content items displayed in the slots; as further described above, a standard content item is displayed using a single slot, so the position bias of a slot indicates a likelihood of the user selecting a standard content item displayed in the slot.

As the size of a content item displayed in the interface also affects the probability of the user selecting the content item when displayed in different slots, the online concierge system also determines an extended position bias for each slot, with the extended position bias for a slot distinct from the position bias for the slot. The extended position bias for a slot indicates a likelihood of the user selecting an extended content item when the slot is the first slot occupied by the extended content item. For example, the extended position bias for a slot is a likelihood of the user selecting the slot when the slot is the first slot occupied by an extended content item. Like the position bias of a slot, the extended position bias of a slot is independent of the content item displayed in the slot. The extended position bias of a slot is determined similar to the position bias of the slot, as further described above. For example, when a user selects an extended content item, the online concierge system determines a slot in an interface that was the first slot occupied by the extended content item, and determines frequencies or rates of interactions by users with the determined slot when different extended content items were presented, allowing the position bias of the determined slot to account for interactions by users with the determined slot when extended content items are displayed via the determined slot. By determining the position bias for slots when standard content items are displayed and determining the extended position bias for slots when extended content items are displayed, the online concierge system accounts for variances in user interactions with slots based on their location in a display and based on sizes of content items displayed in the slots.

The online concierge system selects standard sponsored content items and extended content item for display to the user via the interface in response to the received request for content. In various embodiments, the online concierge system 102 selects 630 standard sponsored content items and extended sponsored content items corresponding to items that at least partially match information in the request for content. For example, the request for content includes a search query, so the online concierge system selects standard sponsored content items and extended sponsored content item corresponding to items having information (e.g., a name, a description, etc.) that at least partially matches the search query. However, in various embodiments, the online concierge system selects sponsored content items, including standard sponsored content items and extended sponsored content items, having any suitable criteria.

To determine an order in which selected sponsored content items, including standard sponsored content items and extended sponsored content items, are displayed and positions of the sponsored content items in the interface, the online concierge system ranks the selected sponsored content items based on their corresponding content scores. In the ranking, sponsored content items with higher content scores have higher positions in the ranking, so a selected sponsored content item with a maximum content score has a highest position in the ranking. This allows the ranking to account for probabilities of the user interacting with different selected sponsored content items based on attributes of the selected sponsored content items and characteristics of the user.

While the ranking accounts for probabilities of the user interacting with different selected sponsored content items, user interaction is also affected by slots in the interface in which a sponsored content item is displayed. To account for changes in user interaction with selected sponsored content items based on slots in which the sponsored content items are displayed, the online concierge system generates a directed acyclic graph, where each node in the directed acyclic graph corresponds to a state of the interface where sponsored content items are positioned in different slots. To generate the directed acyclic graph, the online concierge system maintains an index of slots of the interface in which a sponsored content item is capable of being displayed. In various embodiments, the index sequentially numbers the slots of the interface in which the sponsored content item is capable of being displayed. In various embodiments, a node in the directed acyclic graph is identified by a pair comprising a number of selected standard sponsored content items included in the interface and a number of slots in which a sponsored content item is displayed. In the pair identifying a node, the number of slots in which a sponsored content item is displayed indicates that a sponsored content item is displayed in each slot having an index value less than or equal to the number of slots, with slots capable of displaying sponsored content items having index values greater than the number of slots in which the sponsored content item is displayed do not display sponsored content items. For example, a node specifying that 3 slots display sponsored content items corresponds to slots having the first three index values displaying sponsored content items, while slots having index values greater than three do not display sponsored content items.

An edge between nodes in the directed acyclic graph corresponds to displaying a sponsored content item identified by the edge at a slot corresponding to an index value of a node to which the edge is directed. Hence, an edge between a starting node corresponding to a specific number of slots in which a sponsored content item is displayed and a destination node corresponding to an incremented specific number of slots in which a sponsored content item is displayed corresponds to displaying a sponsored content item identified by the edge at a slot with an index value corresponding to the incremented specific number of slots specified by the destination node. Additionally, each edge between a starting node and a destination node has a weight comprising an expected value of displaying the sponsored content item identified by the edge in the slot having an index value corresponding to the destination node. In various embodiments, the expected value comprises a product of a bid amount of the sponsored content item identified by the edge, the content value for the sponsored content item identified by the edge, and the position bias or extended position bias of the slot having the index value corresponding to the destination node.

When generating the directed acyclic graph, the online concierge system uses the ranking of selected sponsored content items based on their corresponding content scores to place selected sponsored content items in nodes of the directed acyclic graph corresponding to slots of the interface. In various embodiments, when determining a selected sponsored content item for a slot for node of the directed acyclic graph, the online concierge system determines a selected sponsored content item having a maximum position in the ranking that is not already placed in a slot. When determining a selected sponsored content item for a slot, the online concierge system generates different nodes for the slot, with a node corresponding to placing a selected standard sponsored content item in the slot and a different node corresponding to placing a selected extended sponsored content item in the slot. The selected standard sponsored content item placed in the slot is a selected standard sponsored content item having a highest position in the ranking that is not already placed in another slot, and the selected extended sponsored content item placed in the slot is a selected extended sponsored content item having a highest position in the ranking that is not already placed in another slot. Hence, each edge of the directed acyclic graph includes a selected sponsored content item for a slot corresponding to a destination node of the edge that is not already placed in a different slot and having particular sizing information that has a highest position in the ranking.

When placing sponsored content items in slots corresponding to nodes in the directed acyclic graph, the online concierge system accounts for one or more layout constraints. For example, a layout constraint specifies that an extended sponsored content item occupies adjacent slots in a common row (or in a common column). This prevents an extended content item from being placed in a slot that is not adjacent to a sufficient number of slots along a common axis that equals a number of slots comprising the extended content item. By enforcing one or more layout constraints on slots that can include an extended sponsored content item, the online concierge system reduces a number of potential combinations of placement of sponsored content items in different slots to be evaluated by the online concierge system. Example layout constraints include an extended sponsored content item being displayed in adjacent slots in a common row, an extended sponsored content item being displayed in adjacent slots in a common column, an extended sponsored content item being displayed in a slot having an adjacent slot in which a sponsored content item is capable of being displayed, a sponsored content item is not displayed in a slot that is indicated as ineligible to display a sponsored content item, and any combination thereof. Hence, a combination of selected sponsored content items and slot in a node of the directed acyclic graph satisfies one or more layout constraints enforced by the online concierge system, so when generating the directed acyclic graph, the online concierge system does not evaluate combinations of slots and selected sponsored content items that do not conform to layout constraints enforced by the online concierge system, reducing a number of combinations of slots and selected sponsored content items evaluated by the online concierge system.

To generate the interface, the online concierge system 102 computes the aggregate expected value for edges along each path through the directed acyclic graph. The online concierge system selects a path through the directed acyclic graph having a maximum expected value and generates the interface by placing selected standard sponsored content items and selected extended content items identified by edges along the selected path in slots corresponding to destination nodes of the edges along the selected path through the directed acyclic graph. As the expected values of edges between nodes in the directed acyclic graph account for both content scores of selected sponsored content items and position biases or extended position biases of slots in which the sponsored content items are displayed, the expected values used to determine placement of selected sponsored content items in different slots account for both the user's likelihood of interacting with a selected sponsored content item and likelihoods of interaction with different slots in which sponsored content items are presented.

Generating the directed acyclic graph and determining slots of the interface in which sponsored content items based on paths through the directed acyclic graph allows the online concierge system to more efficiently determine placement of sponsored content items in slots of an interface, while accounting for likelihoods of the user interacting with sponsored content items and likelihoods of the user interacting with different slots in the interface. By including a highest sponsored content item in the ranking based on content scores in the directed acyclic graph, the online concierge system reduces a number of combinations of sponsored content item and slots that are evaluated by reducing a number of sponsored content items evaluated for different slots in the interface. This conserves computational resources for determining placement of sponsored content items in slots of the interface, reducing latency during the selection process, while allowing the online concierge system to more accurately account for likelihoods of the user interacting with both content items and different slots in the interface.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
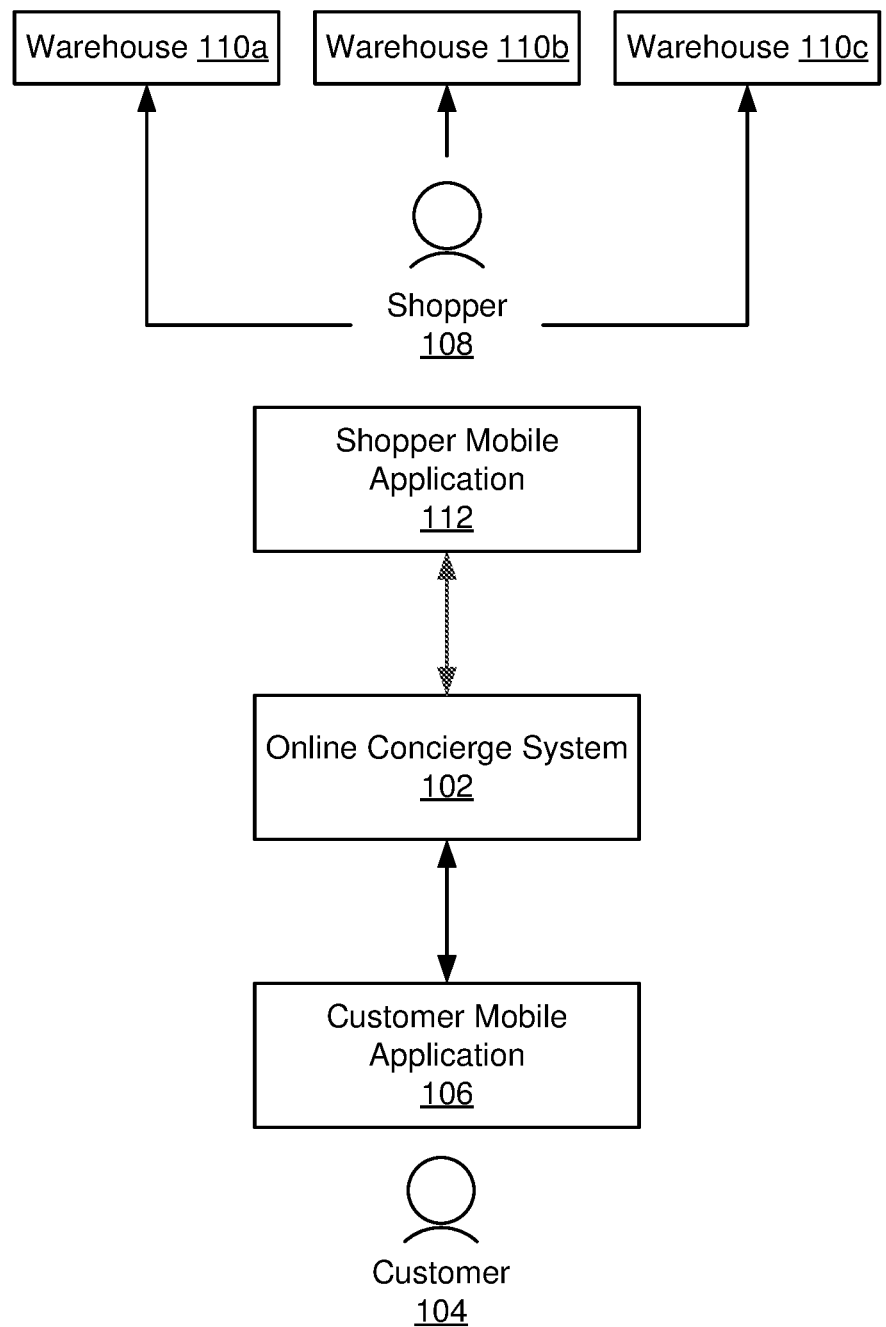
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The system 102 is configured to receive orders from one or more users 104 (only one is shown for the sake of simplicity). An order specifies a list of goods (items or products) to be delivered to the user 104. The order also specifies the location to which the goods are to be delivered, and a time window during which the goods should be delivered. In some embodiments, the order specifies one or more retailers from which the selected items should be purchased. The user may use a customer mobile application (CMA) 106 to place the order; the CMA 106 is configured to communicate with the online concierge system 102.

The online concierge system 102 is configured to transmit orders received from users 104 to one or more shoppers 108. A shopper 108 may be a contractor, employee, other person (or entity), robot, or other autonomous device enabled to fulfill orders received by the online concierge system 102. The shopper 108 travels between a warehouse and a delivery location (e.g., the user's home or office). A shopper 108 may travel by car, truck, bicycle, scooter, foot, or other mode of transportation. In some embodiments, the delivery may be partially or fully automated, e.g., using a self-driving car. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to users. Each shopper 108 fulfills an order received from the online concierge system 102 at one or more warehouses 110, delivers the order to the user 104, or performs both fulfillment and delivery. In one embodiment, shoppers 108 make use of a shopper mobile application 112 which is configured to interact with the online concierge system 102.

Figure 2:
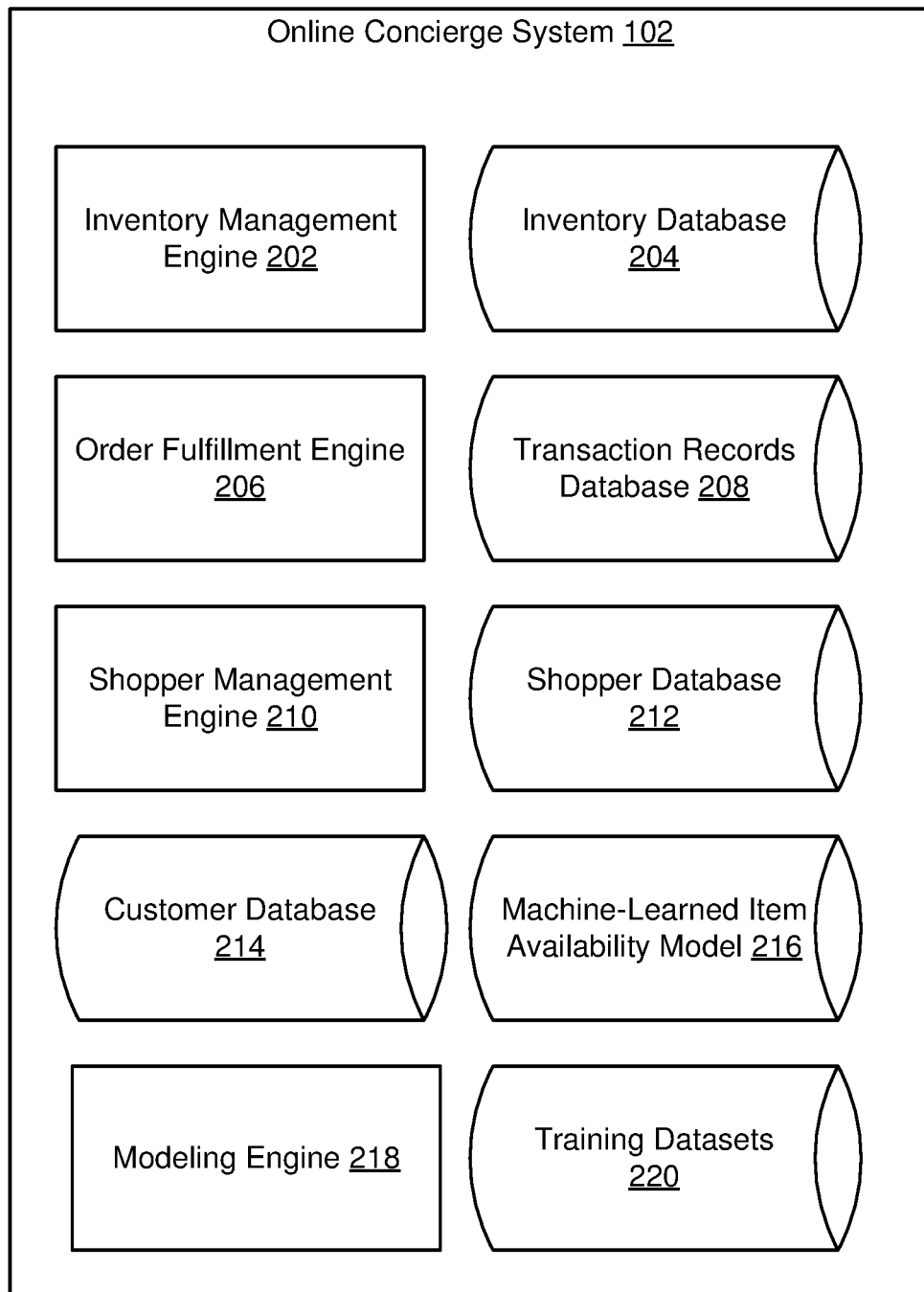
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

In various embodiments, the inventory management engine 202 maintains a taxonomy of items offered for purchase by one or more warehouses 110. For example, the inventory management engine 202 receives an item catalog from a warehouse 110 identifying items offered for purchase by the warehouse 110. From the item catalog, the inventory management engine 202 determines a taxonomy of items offered by the warehouse 110. different levels in the taxonomy providing different levels of specificity about items included in the levels. In various embodiments, the taxonomy identifies a generic item description and associates one or more specific items with the generic item identifier. For example, a generic item description identifies "milk," and the taxonomy associates identifiers of different milk items (e.g., milk offered by different brands, milk having one or more different attributes, etc.), with the generic item identifier. Thus, the taxonomy maintains associations between a generic item description and specific items offered by the warehouse 110 matching the generic item description. In some embodiments, different levels in the taxonomy identify items with differing levels of specificity based on any suitable attribute or combination of attributes of the items. For example, different levels of the taxonomy specify different combinations of attributes for items, so items in lower levels of the hierarchical taxonomy have a greater number of attributes, corresponding to greater specificity in a generic item description, while items in higher levels of the hierarchical taxonomy have a fewer number of attributes, corresponding to less specificity in a generic item description. In various embodiments, higher levels in the taxonomy include less detail about items, so greater numbers of items are included in higher levels (e.g., higher levels include a greater number of items satisfying a broader generic item description). Similarly, lower levels in the taxonomy include greater detail about items, so fewer numbers of items are included in the lower levels (e.g., higher levels include a fewer number of items satisfying a more specific generic item description). The taxonomy may be received from a warehouse 110 in various embodiments. In other embodiments, the inventory management engine 202 applies a trained classification module to an item catalog received from a warehouse 110 to include different items in levels of the taxonomy, so application of the trained classification model associates specific items with generic item descriptions corresponding to levels within the taxonomy Inventory information provided by the inventory management engine 202 may supplement the training datasets 220. Inventory information provided by the inventory management engine 202 may not necessarily include information about the outcome of picking a delivery order associated with the item, whereas the data within the training datasets 220 is structured to include an outcome of picking a delivery order (e.g., if the item in an order was picked or not picked).

The online concierge system 102 also includes an order fulfillment engine 206 which is configured to synthesize and display an ordering interface to each user 104 (for example, via the customer mobile application 106). The order fulfillment engine 206 is also configured to access the inventory database 204 in order to determine which products are available at which warehouse 110. The order fulfillment engine 206 may supplement the product availability information from the inventory database 204 with an item availability predicted by the machine-learned item availability model 216. The order fulfillment engine 206 determines a sale price for each item ordered by a user 104. Prices set by the order fulfillment engine 206 may or may not be identical to in-store prices determined by retailers (which is the price that users 104 and shoppers 108 would pay at the retail warehouses). The order fulfillment engine 206 also facilitates transactions associated with each order. In one embodiment, the order fulfillment engine 206 charges a payment instrument associated with a user 104 when he/she places an order. The order fulfillment engine 206 may transmit payment information to an external payment gateway or payment processor. The order fulfillment engine 206 stores payment and transactional information associated with each order in a transaction records database 208.

An interface generated by the order fulfillment engine 206 for a user displays various content items to the user. A content item identifies or describes an item offered by a warehouse 110 in various embodiments. The interface includes multiple slots, with each slot identifying a location in a display where a content item is displayed. Each slot has corresponding dimensions specifying a height and a width of the slot in which a content item is displayed; in some embodiments, dimensions of a slot are equal to dimensions of other slots, uniformly allocating display area to different content items. Content items are associated with sizing information, with sizing information of a content item identifying a number of adjacent slots in the interface in which the content item is displayed. A standard content item has sizing information indicating the standard content item is displayed in a single slot, while an extended content item has sizing information indicating the extended content item is displayed in multiple adjacent slots. Certain content items are sponsored content items that include a bid amount specifying an amount of compensation the online concierge system 102 receives in response to displaying the sponsored content item or in response to the user performing a specific interaction after the sponsored content item is displayed to the user.

To account for different sizing information for different content items, the order fulfillment engine 206 determines a content score for different sponsored content items when generating an interface for a user. As further described below in conjunction with FIGS. 6 and 7, the content score for a content item provides a measure of a likelihood of the user interacting with the content item based on characteristics of the user and attributes of the content item. As a position in the interface where a content item is displayed also affects a likelihood of the user interacting with the content item, the order fulfillment engine 206 determines a position bias for each slot and determines an extended position bias for each slot. As further described below in conjunction with FIG. 6, the position bias for a slot provides a measure of a likelihood of a user interacting with a standard content item that is displayed in only the slot, independent of content of the standard content item, while the extended position bias for the slot provides a measure of a likelihood of the user interacting with an extended content item that is displayed in the slot and in one or more adjacent slots, independent of content of the extended content item.

As further described below in conjunction with FIGS. 6 and 7, to determine slots of the interface in which sponsored content items are displayed to the user, the online concierge system generates a directed acyclic graph where each node in the directed acyclic graph corresponds to a state of the interface where sponsored content items are positioned in different slots. An edge between nodes in the directed acyclic graph corresponds to displaying a sponsored content item identified by the edge at a slot corresponding to an index value of a node to which the edge is directed. Hence, an edge between a starting node corresponding to a specific number of slots in which a sponsored content item is displayed and a destination node corresponding to an incremented specific number of slots in which a sponsored content item is displayed corresponds to displaying a sponsored content item identified by the edge at a slot with an index value corresponding to the incremented specific number of slots specified by the destination node. Additionally, each edge between a starting node and a destination node has a weight comprising an expected value of displaying the sponsored content item identified by the edge in the slot having an index value corresponding to the destination node. In various embodiments, the expected value comprises a product of a bid amount of the sponsored content item identified by the edge, the content value for the sponsored content item identified by the edge, and the position bias or extended position bias of the slot having the index value corresponding to the destination node. As further described below in conjunction with FIGS. 6 and 7, the order fulfillment engine 206 determines positions of sponsored content items in the interface by determining a path traversing the directed acyclic graph having a maximum aggregation of expected values of edges comprising the path and positioning sponsored content items identified by edges of the path in slots corresponding to nodes along the path In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and user 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse to fulfill the order based on one or more parameters, such as a probability of item availability determined by a machine-learned item availability model 216, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the user 104), his/her familiarity level with that particular warehouse 110, and so on. Additionally, the shopper management engine 210 accesses a shopper database 212 which stores information describing each shopper 108, such as his/her name, gender, rating, previous shopping history, and so on.

As part of fulfilling an order, the order fulfillment engine 206 and/or shopper management engine 210 may access a user database 214 which stores information describing each user. This information could include each user's name, address, gender, shopping preferences, favorite items, stored payment instruments, and so on.

Machine Learning Models

The online concierge system 102 further includes a machine-learned item availability model 216, a modeling engine 218, and training datasets 220. The modeling engine 218 uses the training datasets 220 to generate the machine-learned item availability model 216. The machine-learned item availability model 216 can learn from the training datasets 220, rather than follow only explicitly programmed instructions. The inventory management engine 202, order fulfillment engine 206, and/or shopper management engine 210 can use the machine-learned item availability model 216 to determine a probability that an item is available at a warehouse 110. The machine-learned item availability model 216 may be used to predict item availability for items being displayed to or selected by a user or included in received delivery orders. A single machine-learned item availability model 216 is used to predict the availability of any number of items.

The machine-learned item availability model 216 can be configured to receive as inputs information about an item, the warehouse for picking the item, and the time for picking the item. The machine-learned item availability model 216 may be adapted to receive any information that the modeling engine 218 identifies as indicators of item availability. At minimum, the machine-learned item availability model 216 receives information about an item-warehouse pair, such as an item in a delivery order and a warehouse at which the order could be fulfilled. Items stored in the inventory database 204 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 204 and/or warehouse database and provide this extracted information as inputs to the item availability model 216.

The machine-learned item availability model 216 contains a set of functions generated by the modeling engine 218 from the training datasets 220 that relate the item, warehouse, and timing information, and/or any other relevant inputs, to the probability that the item is available at a warehouse. Thus, for a given item-warehouse pair, the machine-learned item availability model 216 outputs a probability that the item is available at the warehouse. The machine-learned item availability model 216 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 216 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper, or predicted to be unavailable but found by the shopper). In some examples, the confidence score is based in part on the age of the data for the item, e.g., if availability information has been received within the past hour, or the past day. The set of functions of the item availability model 216 may be updated and adapted following retraining with new training datasets 220. The machine-learned item availability model 216 may be any machine learning model, such as a neural network, boosted tree, gradient boosted tree or random forest model. In some examples, the machine-learned item availability model 216 is generated from XGBoost algorithm.

The item probability generated by the machine-learned item availability model 216 may be used to determine instructions delivered to the user 104 and/or shopper 108, as described in further detail below.

The training datasets 220 relate a variety of different factors to known item availabilities from the outcomes of previous delivery orders (e.g. if an item was previously found or previously unavailable). The training datasets 220 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 220 includes the outcome of a previous delivery order (e.g., if the item was picked or not). The item characteristics may be determined by the machine-learned item availability model 216 to be statistically significant factors predictive of item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 216 may weight these factors differently, where the weights are a result of a "learning" or training process on the training datasets 220. The training datasets 220 are very large datasets taken across a wide cross section of warehouses, shoppers, items, warehouses, delivery orders, times and item characteristics. The training datasets 220 are large enough to provide a mapping from an item in an order to a probability that the item is available at a warehouse. In addition to previous delivery orders, the training datasets 220 may be supplemented by inventory information provided by the inventory management engine 202. In some examples, the training datasets 220 are historic delivery order information used to train the machine-learned item availability model 216, whereas the inventory information stored in the inventory database 204 include factors input into the machine-learned item availability model 216 to determine an item availability for an item in a newly received delivery order.

In some examples, the modeling engine 218 may evaluate the training datasets 220 to compare a single item's availability across multiple warehouses to determine if an item is chronically unavailable. This may indicate that an item is no longer manufactured. The modeling engine 218 may query a warehouse 110 through the inventory management engine 202 for updated item information on these identified items.

Additionally, the modeling engine 218 maintains a trained purchase model that outputs a probability of the user purchasing an item. The trained purchase model accounts for times when the user previously purchased an item, such as a relative time from a previously received order including the item to a time when the model is applied, as well as attributes of the item (e.g., a type of the item, a quantity or an amount of the item that was previously purchased, a brand of the item). The trained purchase model may include a decay constant that decreases a weighting of purchases of the items over time, so purchases of the item at longer time intervals from the time when the trained purchase model is applied have lower weights than weights of purchases at the item at shorter time intervals from the time when the trained purchase model is applied. Additionally, the trained purchase model accounts for a frequency with which the user purchases an item, which increases a likelihood of the user purchasing an item if the user more frequently purchases the item. Other example factors used by the trained purchase model to determine the likelihood of a user purchasing an item include: a time interval between prior orders including the item received from the user, a frequency with which the item is included in prior orders received from the user, times when orders including the item were previously received from the user, preferences of the user, and any other suitable information. The trained purchase model may be trained using any suitable method or combination of methods (e.g., supervised learning, unsupervised learning, semi-supervised learning, etc.).

Machine Learning Factors

The training datasets 220 include a time associated with previous delivery orders. In some embodiments, the training datasets 220 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 220 include a day of the week previous delivery orders were placed. The day of the week may impact item availability, since popular shopping days may have reduced inventory of items or restocking shipments may be received on particular days. In some embodiments, training datasets 220 include a time interval since an item was previously picked in a previously delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 220 include a time interval since an item was not found in a previous delivery order. If there has been a short time interval since an item was not found, this may indicate that there is a low probability that the item is available in subsequent delivery orders. And conversely, if there is has been a long time interval since an item was not found, this may indicate that the item may have been restocked and is available for subsequent delivery orders. In some examples, training datasets 220 may also include a rate at which an item is typically found by a shopper at a warehouse, a number of days since inventory information about the item was last received from the inventory management engine 202, a number of times an item was not found in a previous week, or any number of additional rate or time information. The relationships between this time information and item availability are determined by the modeling engine 218 training a machine learning model with the training datasets 220, producing the machine-learned item availability model 216.

The training datasets 220 include item characteristics. In some examples, the item characteristics include a department associated with the item. For example, if the item is yogurt, it is associated with the dairy department. The department may be the bakery, beverage, nonfood and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability, since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 202. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 218 training a machine learning model with the training datasets 220, producing the machine-learned item availability model 216.

The training datasets 220 may include additional item characteristics that affect the item availability and can therefore be used to build the machine-learned item availability model 216 relating the delivery order for an item to its predicted availability. The training datasets 220 may be periodically updated with recent previous delivery orders. The training datasets 220 may be updated with item availability information provided directly from shoppers 108. Following updating of the training datasets 220, a modeling engine 218 may retrain a model with the updated training datasets 220 and produce a new machine-learned item availability model 216.

Customer Mobile Application

Figure 3A:
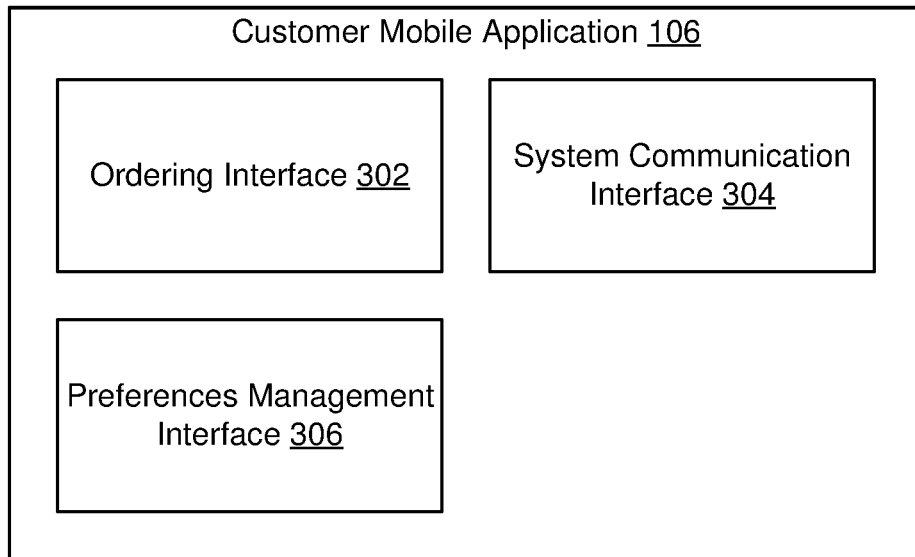
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the user 104 can browse through and select products and place an order. The CMA 106 also includes a system communication interface 304 which, among other functions, receives inventory information from the online shopping concierge system 102 and transmits order information to the system 102. The CMA 106 also includes a preferences management interface 306 which allows the user 104 to manage basic information associated with his/her account, such as his/her home address and payment instruments. The preferences management interface 306 may also allow the user to manage other details such as his/her favorite or preferred warehouses 110, preferred delivery times, special instructions for delivery, and so on.

Figures 4, 5:
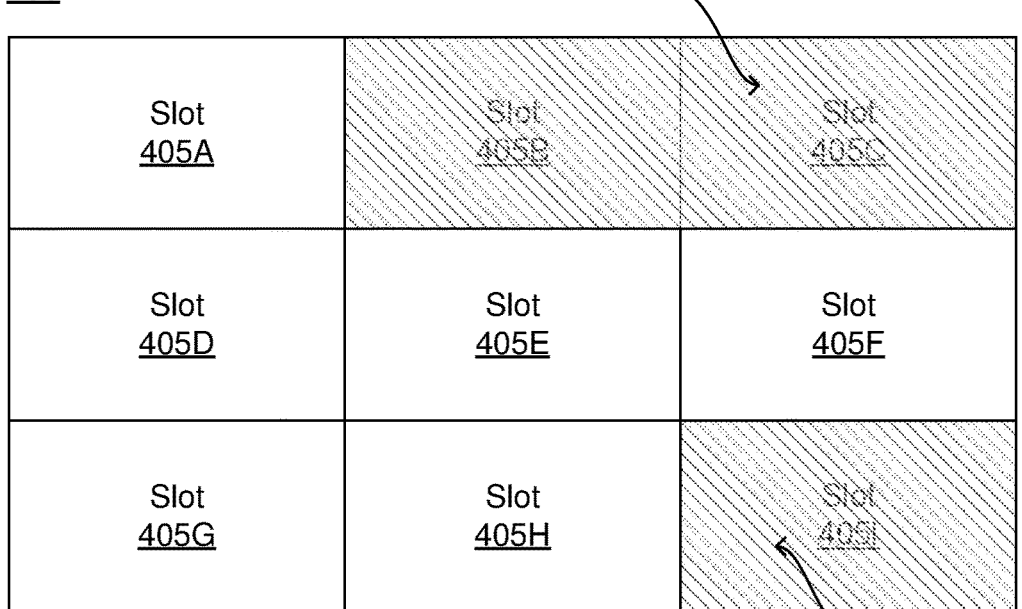
FIG. 4 is an example interface of a customer mobile application including slots for displaying representations of items offered by a warehouse, according to one embodiment.
FIG. 5 is an example interface of a customer mobile application displaying representations of items having different dimensions, according to one embodiment.

The CMA 106 displays content items, such as content items corresponding to various items offered by one or more warehouses, to a user, allowing the user to select information about an item or to include an item in an order by selecting content item corresponding to an item offered by a warehouse 110. In various embodiments, one or more interfaces of the CMA 106 (e.g., ordering interface 302) include different slots in which content items are displayed. FIG. 4 shows an example interface 400 of the CMA for displaying content items to a user. As shown in FIG. 4, the interface 400 includes multiple slots 405A-I (also referred to individually and collectively using reference number 405). In various embodiments, such as the embodiment shown by FIG. 4, each slot 405 has a common size. Hence, dimensions of each of slot 405A-I are equal in various embodiments. In other embodiments, different slots 405 have different dimensions.

Additionally, in some embodiments, the online concierge system 102 maintains different types of content items. For example, the online concierge system 102 maintains sponsored content items for which the online concierge system 102 receives compensation from an entity (e.g., a warehouse 110, a third party system, a manufacturer, etc.) in exchange for displaying a content item or in exchange for a user performing a specific interaction after the content item is displayed to the user. In various embodiments, a sponsored content item includes a bid amount specifying an amount of compensation the online concierge system 102 receives in response to displaying the sponsored content item or in response to a user performing a specific interaction after the content item was displayed to the user. The online concierge system 102 also maintains organic content items for which the online concierge system 102 does not receive compensation in response to displaying. In various embodiments, the online concierge system 102 maintains any suitable number of types of content items.

When the online concierge system 102 maintains different types of content items, the online concierge system 102 enforces display constraints in some embodiments. An example display constraint limits display of content items having a specific type to certain slots 405 of the interface; for example, a display constraint limits display of sponsored content items to specific slots 405 of the interface, preventing display of sponsored content items in slots other than the specific slots 405. In a specific example referring to FIG. 4, sponsored content items are capable of being displayed in slots 405A, 405B, 405C, 405H, and 405I, with sponsored content items prevented from being displayed in slots 405D, 405E, 405F, and 405G. Maintaining display constraints allows the online concierge system 102 to allocate certain slots 405 of the interface 400 for displaying content items having a particular type.

In various embodiments, the online concierge system 102 maintains different sizes of content items. For example, a standard content item has dimensions corresponding to dimensions of a single slot 405, while an extended content item has dimensions corresponding to dimensions of multiple adjacent slots 405. For example, an extended content item has dimensions corresponding to two adjacent slots 405. In some embodiments, the extended content item has dimensions corresponding to two horizontally adjacent slots 405, while in other embodiments, the extended content item has dimensions corresponding to two vertically adjacent slots 405. FIG. 5 is an example of the interface 400 displaying representations of items having different dimensions. For purposes of illustration, FIG. 5 identifies sponsored content items in an example where the interface 400 displays an extended content item 505 and a standard content item 510. As shown in FIG. 5, the extended content item 505 is displayed using two adjacent slots, slot 405B and slot 405B. While FIG. 5 shows an embodiment where the extended content item 505 is displayed in two horizontally adjacent slots 405, in other embodiments, the extended content item 505 is displayed using any suitable number of adjacent slots 405 in the interface and may be displayed using slots adjacent to each other along any suitable axis. The standard content item 510 is displayed using a single slot, slot 405I.

Shopper Mobile Application

Figure 3B:
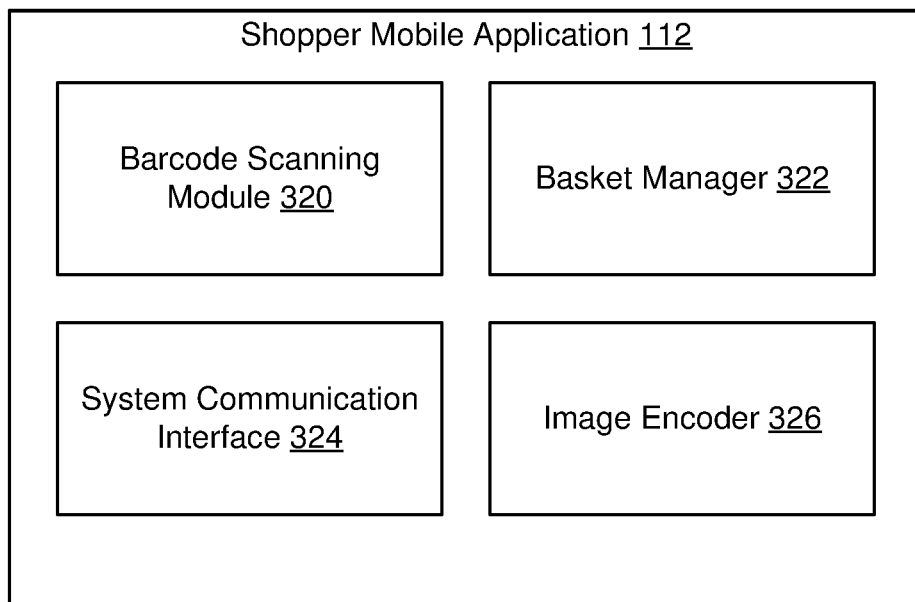
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Figure 6:
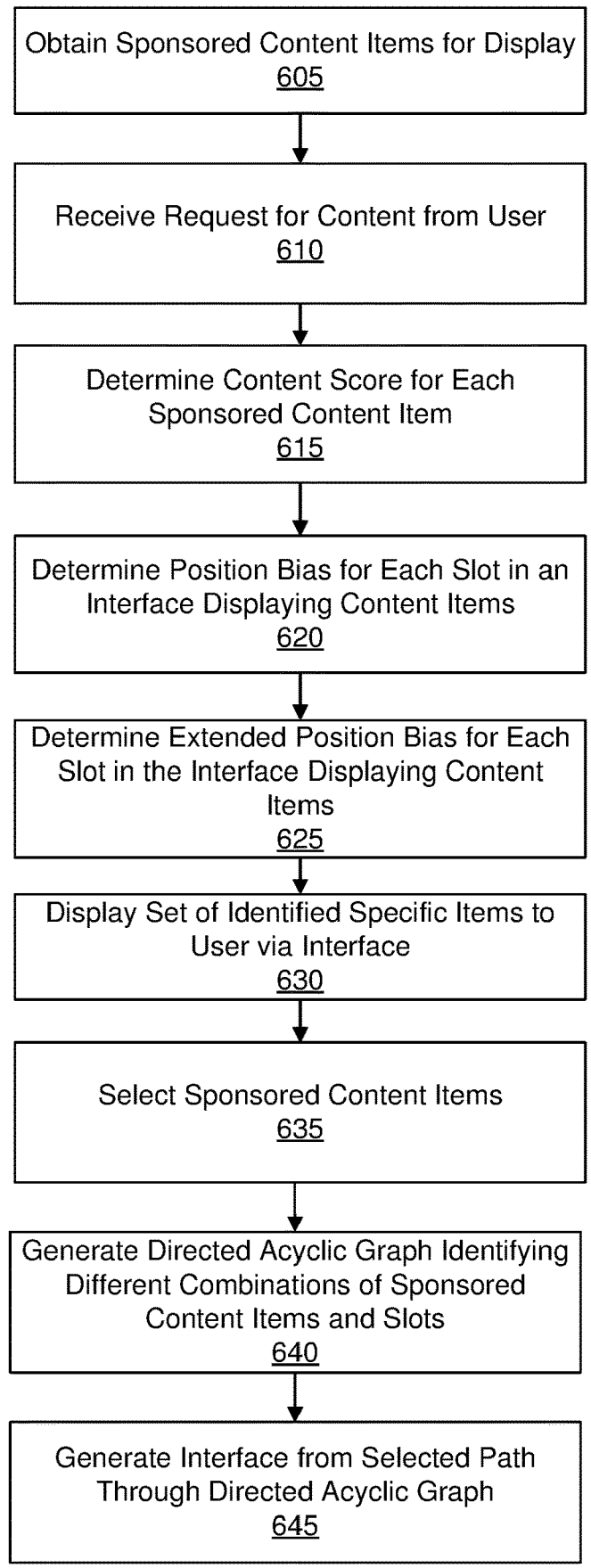
FIG. 6 is a flowchart of a method for an online concierge system determining placement of content items with different dimensions in an interface for display to a user, according to one embodiment.

Determining Placement of Content Items with Different Dimensions in an Interface FIG. 6 is a flowchart of one embodiment of a method for an online concierge system 102 determining placement of content items with different dimensions in an interface for display to a user. In various embodiments, the method includes different or additional steps than those described in conjunction with FIG. 6. Further, in some embodiments, the steps of the method may be performed in different orders than the order described in conjunction with FIG. 6. The method described in conjunction with FIG. 6 may be carried out by the online concierge system 102 in various embodiments.

The online concierge system 102 obtains 605 content items for display to users. For example, a content item includes information describing a corresponding item offered for purchase by a warehouse 110. As an example, a content item includes an image and a name of the item, while in other examples the content item includes a textual description of an item. However, a content item may include any suitable information describing an item, such as image data, text data, audio data, video data, or any combination thereof. A content item may be received from a warehouse 110 offering the item, received from a third party system (e.g., a manufacturer of the item), generated by the online concierge system 102, or obtained 605 from any suitable source in various embodiments.

A content item is associated with a type in various embodiments. In various embodiments, a type identifies a content item as sponsored or organic. For a sponsored content item, the online concierge system 102 receives compensation from an entity (e.g., a warehouse 110, a third party system, a manufacturer, etc.) in exchange for displaying the sponsored content item or in exchange for a user performing a specific interaction after the sponsored content item is displayed to the user. A sponsored content item includes a bid amount specifying an amount of compensation the online concierge system 102 receives in response to displaying the sponsored content item or in response to a user performing a specific interaction after the sponsored content item was displayed to the user in various embodiments. The online concierge system 102 does not receive compensation from an entity for displaying an organic content item. In various embodiments, the online concierge system 102 maintains any suitable number of types of content items.

Additionally, each content item has sizing information specifying dimensions of a portion of an interface in which the content item is displayed. As further described above in conjunction with FIGS. 4 and 5, an interface generated by the online concierge system 102 to display content items includes a plurality of slots, with each slot having specified dimensions. Sizing information for a content item identifies a number of adjacent slots used to display the content item. For example, sizing information of "1" indicates a content item is displayed with a single slot, while sizing information of "2" indicates a content item is displayed with two adjacent slots. In some embodiments, the sizing information specifies a directionality of adjacent slots for displaying a content item, allowing the sizing information to identify whether horizontally adjacent slots or vertically adjacent slots are used to display the content item. Alternatively, the online concierge system 102 maintains a specific orientation for displaying content items, so the sizing information specifies a number of adjacent slots for displaying a content item along the specific orientation. For example, the online concierge system 102 displays content items in horizontal rows, so the sizing information of a content item specifies a number of horizontally adjacent slots used to display the content item.

When the online concierge system 102 receives 610 a request for content from a user, the online concierge system 102 determines 615 a content score that is unrelated to a position in an interface where the content item having the specific type is displayed. For example, the online concierge system 102 determines 615 a content score for each sponsored content item. In various embodiments, the online concierge system 102 applies a trained interaction model to a combination of the user and a content item to determine 615 the content score for the content item. For example, the content score for the content item is a probability of the user selecting the content item determined from attributes of the content item and characteristics of the user. In other embodiments, the content score for the content item is a probability of the user performing a specific interaction with the online concierge system 102 after the content item is displayed to the user. Example specific interactions include: including an item corresponding to the content item in an order, requesting additional information about the item corresponding to the content item from the online concierge system 102, or any other suitable interaction. The online concierge system 102 maintains different trained interaction models for different specific interactions, and applies a trained interaction model for a particular specific interaction to combinations of the user and sponsored content items (or content items having another specific type) after receiving 610 the request for content from the user.

As further described above in conjunction with FIGS. 4 and 5, the interface used by the online concierge system 102 to display content items comprises multiple slots, with each slot corresponding to different locations in a display device displaying the interface and each slot having dimensions specifying a size of a content item displayed using the slot. A slot in which a content item is displayed affects a likelihood of a user selecting or viewing the content item. For example, the online concierge system 102 maintains an index identifying different slots of an interface, with higher positions in the index identifying slots that are displayed in more visible locations of the interface. Referring to FIG. 4, in one embodiments, an index identifies slots in a row by row order, so slot 405A corresponds to a first position in the index, slot 405B corresponds to a second position in the index, slot 405C corresponds to a third position in the index, slot 405D corresponds to a fourth position in the index, with slot 405I corresponding to a ninth position in the index. In other embodiments, the index identifies slots on a column by column order. Hence, in the example of FIG. 4, higher positions in the index correspond to slots displayed in portions of an interface closer to an upper boundary of a display device on which the interface is displayed.

To account for effects of a slot of the interface in which a content item is displayed, the online concierge system 102 determines 620 a position bias for each slot of the interface. The position bias for a slot provides a measure of a user's likelihood of selecting a content item displayed in the slot, independent of attributes of the content item. Thus, the position bias for a slot provides a measure of the user's likelihood of interacting with the slot. In various embodiments, the online concierge system 102 determines 620 the position bias for a slot from interactions by multiple users with interfaces displayed by the online concierge system 102 to the user. For example, when a user selects a content item, the online concierge system 102 determines a slot in an interface that displayed the content item, and determines frequencies or rates of interactions for which different slots are determined, allowing the position bias of a slot to account for interactions by users with different slots. The position bias of a slot corresponds to interaction with standard content items displayed in the slots; as further described above, a standard content item is displayed using a single slot, so the position bias of a slot indicates a likelihood of the user selecting a standard content item displayed in the slot.

As the size of a content item displayed in the interface also affects the probability of the user selecting the content item when displayed in different slots, the online concierge system 102 also determines 625 an extended position bias for each slot, with the extended position bias for a slot distinct from the position bias for the slot. The extended position bias for a slot indicates a likelihood of the user selecting an extended content item when the slot is the first slot occupied by the extended content item. For example, the extended position bias for a slot having an index of 1 is a likelihood of the user selecting the slot when a first slot occupied by an extended content item is the slot having the index of 1. Like the position bias of a slot, the extended position bias of a slot is independent of the content item displayed in the slot. The extended position bias of a slot is determined 625 similar to the position bias of the slot, as further described above. For example, when a user selects an extended content item, the online concierge system 102 determines a slot in an interface that was the first slot occupied by the extended content item, and determines frequencies or rates of interactions by users with the determined slot when different extended content items were presented, allowing the position bias of the determined slot to account for interactions by users with the determined slot when extended content items are displayed via the determined slot. By determining 620 the position bias for slots when standard content items are displayed and determining 625 the extended position bias for slots when extended content items are displayed, the online concierge system 102 accounts for variances in user interactions with slots based on their location in a display and based on sizes of content items displayed in the slots.

The online concierge system 102 selects 630 standard sponsored content items and extended content item for display to the user via the interface in response to the received request for content. In various embodiments, the online concierge system 102 selects 630 standard sponsored content items and extended sponsored content items corresponding to items that at least partially match information in the request for content. For example, the request for content includes a search query, so the online concierge system 102 selects 630 standard sponsored content items and extended sponsored content item corresponding to items having information (e.g., a name, a description, etc.) that at least partially matches the search query. As another example, the request for content identifies a warehouse 110, and the online concierge system 102 selects 630 standard sponsored content items and extended sponsored content items corresponding to items offered for purchase by the warehouse 110. However, in various embodiments, the online concierge system 102 selects 630 sponsored content items, including standard sponsored content items and extended sponsored content items, having any suitable criteria.

To determine an order in which selected sponsored content items, including standard sponsored content items and extended sponsored content items, are displayed and positions of the sponsored content items in the interface, the online concierge system 102 ranks 635 the selected sponsored content items based on their corresponding content scores. In the ranking, sponsored content items with higher content scores have higher positions in the ranking, so a selected sponsored content item with a maximum content score has a highest position in the ranking. This allows the ranking to account for probabilities of the user interacting with different selected sponsored content items based on attributes of the selected sponsored content items and characteristics of the user.

While the ranking 635 accounts for probabilities of the user interacting with different selected sponsored content items, user interaction is also affected by slots in the interface in which a sponsored content item is displayed. To account for changes in user interaction with selected sponsored content items based on slots in which the sponsored content items are displayed, the online concierge system 102 generates 640 a directed acyclic graph, where each node in the directed acyclic graph corresponds to a state of the interface where sponsored content items are positioned in different slots. To generate 640 the directed acyclic graph, the online concierge system 102 maintains an index of slots of the interface in which a sponsored content item is capable of being displayed. In various embodiments, the index sequentially numbers the slots of the interface in which the sponsored content item is capable of being displayed, with the first slot in which a sponsored content item is capable of being displayed having an index of "1," the second slot in which the sponsored content item is capable of being displayed having an index of "2." The online concierge system 102 uses the index of slots to identify nodes in the directed acyclic graph by. In various embodiments, a node in the directed acyclic graph is identified by a pair comprising a number of selected standard sponsored content items included in the interface and a number of slots in which a sponsored content item is displayed. In the pair identifying a node, the number of slots in which a sponsored content item is displayed indicates that a sponsored content item is displayed in each slot having an index value less than or equal to the number of slots, with slots capable of displaying sponsored content items having index values greater than the number of slots in which the sponsored content item is displayed do not display sponsored content items. For example, a node specifying that 3 slots display sponsored content items corresponds to slots having the first three index values displaying sponsored content items, while slots having index values greater than three do not display sponsored content items.

An edge between nodes in the directed acyclic graph corresponds to displaying a sponsored content item identified by the edge at a slot corresponding to an index value of a node to which the edge is directed. Hence, an edge between a starting node corresponding to a specific number of slots in which a sponsored content item is displayed and a destination node corresponding to an incremented specific number of slots in which a sponsored content item is displayed corresponds to displaying a sponsored content item identified by the edge at a slot with an index value corresponding to the incremented specific number of slots specified by the destination node. Additionally, each edge between a starting node and a destination node has a weight comprising an expected value of displaying the sponsored content item identified by the edge in the slot having an index value corresponding to the destination node. In various embodiments, the expected value comprises a product of a bid amount of the sponsored content item identified by the edge, the content value for the sponsored content item identified by the edge, and the position bias or extended position bias of the slot having the index value corresponding to the destination node.

When generating 640 the directed acyclic graph, the online concierge system 102 uses the ranking 635 of selected sponsored content items based on their corresponding content scores to place selected sponsored content items in nodes of the directed acyclic graph corresponding to slots of the interface. In various embodiments, when determining a selected sponsored content item for a slot for node of the directed acyclic graph, the online concierge system 102 determines a selected sponsored content item having a maximum position in the ranking that is not already placed in a slot. When determining a selected sponsored content item for a slot, the online concierge system 102 generates different nodes for the slot, with a node corresponding to placing a selected standard sponsored content item in the slot and a different node corresponding to placing a selected extended sponsored content item in the slot. The selected standard sponsored content item placed in the slot is a selected standard sponsored content item having a highest position in the ranking that is not already placed in another slot, and the selected extended sponsored content item placed in the slot is a selected extended sponsored content item having a highest position in the ranking that is not already placed in another slot. Hence, each edge of the directed acyclic graph includes a selected sponsored content item for a slot corresponding to a destination node of the edge that is not already placed in a different slot and having particular sizing information that has a highest position in the ranking.

When placing sponsored content items in slots corresponding to nodes in the directed acyclic graph, the online concierge system 102 accounts for one or more layout constraints. For example, a layout constraint specifies that an extended sponsored content item occupies adjacent slots in a common row (or in a common column). This prevents an extended content item from being placed in a slot that is not adjacent to a sufficient number of slots along a common axis that equals a number of slots comprising the extended content item. By enforcing one or more layout constraints on slots that can include an extended sponsored content item, the online concierge system 102 reduces a number of potential combinations of placement of sponsored content items in different slots to be evaluated by the online concierge system 102. Example layout constraints include an extended sponsored content item being displayed in adjacent slots in a common row, an extended sponsored content item being displayed in adjacent slots in a common column, an extended sponsored content item being displayed in a slot having an adjacent slot in which a sponsored content item is capable of being displayed, a sponsored content item is not displayed in a slot that is indicated as ineligible to display a sponsored content item, and any combination thereof. Hence, a combination of selected sponsored content items and slots in a node of the directed acyclic graph satisfies one or more layout constraints enforced by the online concierge system 102, so when generating 640 the directed acyclic graph, the online concierge system 102 does not evaluate combinations of slots and selected sponsored content items that do not conform to layout constraints enforced by the online concierge system 102, reducing a number of combinations of slots and selected sponsored content items evaluated by the online concierge system.

Figure 7:
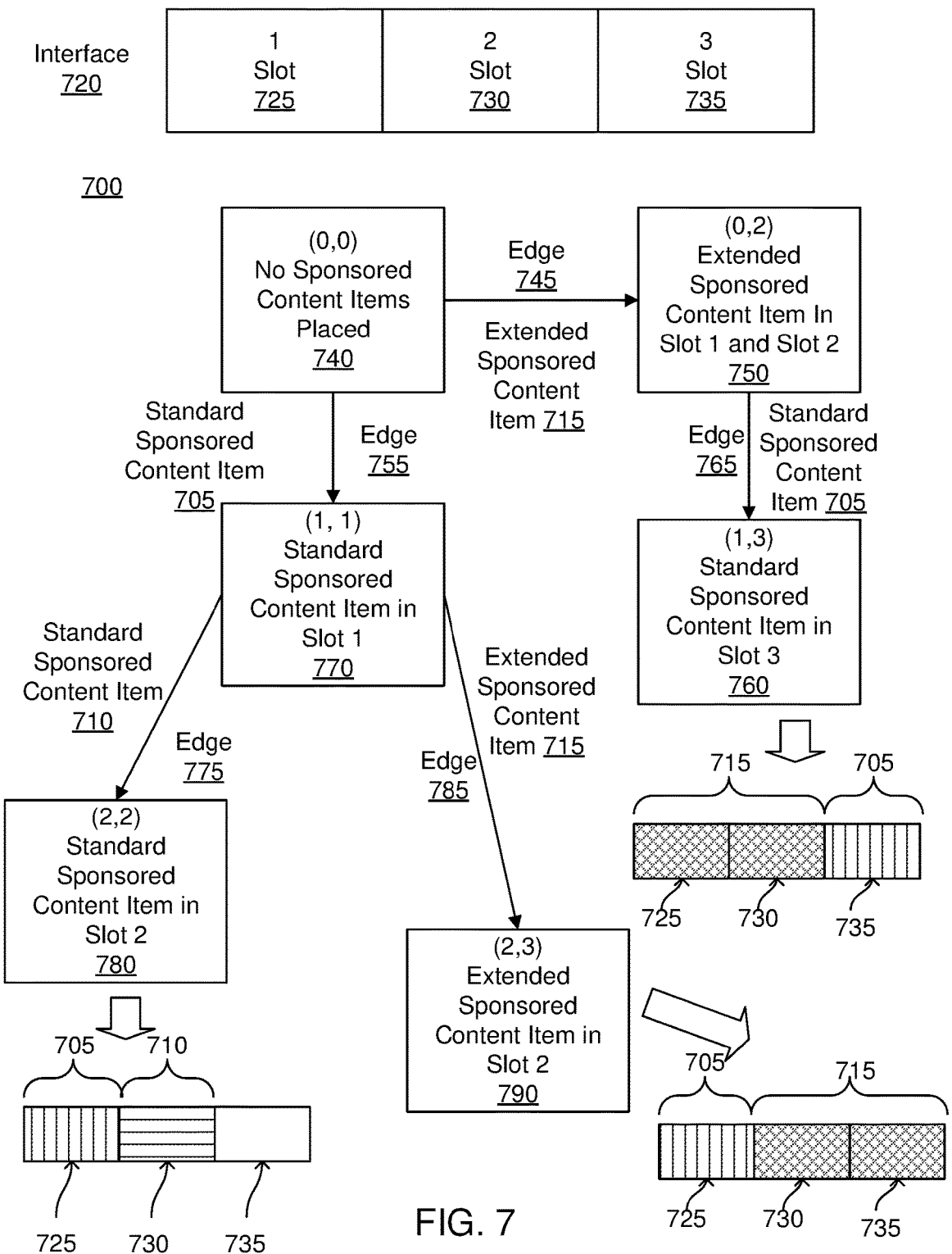
FIG. 7 is an example directed acyclic graph identifying different potential placements of sponsored content items in slots of an interface, according to one embodiment.

FIG. 7 shows an example directed acyclic graph 700 identifying different potential placements of sponsored content items in slots of an interface. For purposes of illustration, FIG. 7 shows an example including three sponsored content items where standard sponsored content item 705 has a highest position in a ranking based on content scores, standard sponsored content item 710 has a second highest position in the ranking based on content scores, and extended sponsored content item 715 has the third highest position in the ranking based on content scores. For purposes of illustration, extended sponsored content item 715 has sizing information indicating it is displayed using two adjacent slots. In the example of FIG. 7, the interface 720 includes three slots, slot 725, slot 730, slot 735, with each slot capable of displaying a sponsored content item. The online concierge system 102 generates an index of the slots, with each slot corresponding to an index value in the index. In the example of FIG. 7, slot 725 has an index value of 1, slot 730 has an index value of 2, and slot 735 has an index value of 3.

To place sponsored content items into slots of the interface 720, the online concierge system 102 generates a directed acyclic graph 700, where each node corresponds to displaying a sponsored content item at a slot corresponding to an index value. Additionally, each node is identified by a pair comprising a number of standard sponsored content items included in the interface and a number of slots in which a sponsored content item is displayed. The number of slots in which a sponsored content item corresponds to an index value of a slot corresponding to the node. A root node 740 of the directed acyclic graph corresponds to a state of the display where no standard sponsored content item is displayed and no slots are displaying a sponsored content item. For slot 725, which has an index value of 1, the online concierge system 102 selects an extended sponsored content item having a highest position in the ranking. In the example of FIG. 7, extended sponsored content item 715 is the extended sponsored content them having the highest position in the ranking, so the online concierge system 102 generates node 750 to correspond to a display where extended sponsored content item 715 is displayed in slot 725. Node 740 is identified by a pair (0, 2), indicating that 0 standard sponsored content items are displayed and 2 slots are occupied displaying sponsored content items.

Edge 745 connects root node 740 to node 750, with edge 725 identifying the sponsored content item to be displayed in the slot having an index value corresponding to node 750, so in FIG. 7, edge 745 identifies extended sponsored content item 715. Additionally, edge 725 includes a weight corresponding to an expected value of the online concierge system 102 for displaying extended sponsored content item 715 in the slot, slot 725, corresponding to the index value of node 740. In various embodiments, the expected value is determined as a product of a bid amount of the sponsored content item identified by the edge, a content score for the sponsored content item identified by the edge and a position bias or an extended position bias for the slot identified by the destination node. In the preceding example, the position bias of the slot identified by the destination node is used in response to the sponsored content item identified by the edge being a standard sponsored content item, while the extended position bias of the slot identified by the destination node is used in response to the sponsored content item identified by the edge being an extended sponsored content item. Hence, in FIG. 7, the expected value for edge 745 is a product of the bid amount for extended sponsored content item 715, the content score for extended sponsored content item 715, and the extended position bias for slot 725, which has the index value of 1.

From node 750, the online concierge system 102 evaluates placement of a sponsored content item in a slot capable of displaying a sponsored content item having an index value subsequent to the slots already displaying sponsored content items. In the example of FIG. 7, slot 725 and slot 730, having index values 1 and 2, are displaying a sponsored content item in node 740, so the online concierge system 102 identifies slot 735, which has the index value of 3. In various embodiments, to identify the slot for evaluation in a subsequent node, the online concierge system 102 identifies a slot having an index value corresponding to the number of slots occupied displaying sponsored content items in a starting node incremented by a fixed value, such as by 1. Hence, in FIG. 7, node 750 corresponds to 2 slots occupied displaying sponsored content items from the (0,2) pair identifying node 750, so the online concierge system increments the value of 2, indicating the number of slots occupied displaying sponsored content items, by one to identify the index value of a slot to be evaluated in a node to which node 750 is directed. In FIG. 7, the online concierge system 102 generates node 760 as a destination node from node 750. For node 760, the online concierge system 102 selects a sponsored content item having a highest position in the ranking based on content scores that is not already occupying a slot. In the example of FIG. 7, standard sponsored content item 705 is not occupying a slot and has a highest position in the ranking based on content score, so node 760 corresponds to displaying standard sponsored content item 705 in slot 735. Node 760 is identified by a pair (1,3), corresponding to display of 1 standard sponsored content item and 3 slots being occupied displaying sponsored content items.

Edge 765 connects node 750 to node 760, with edge 765 identifying the sponsored content item to be displayed in the slot having an index value corresponding to node 760, so in FIG. 7, edge 765 identifies standard sponsored content item 705. Additionally, edge 745 includes a weight corresponding to an expected value of the online concierge system 102 for displaying standard sponsored content item 705 in the slot, slot 730, corresponding to the index value of node 760. As further described above, in FIG. 7, the expected value for edge 765 is a product of the bid amount for standard sponsored content item 705, the content score for standard sponsored content item 705, and the position bias for slot 735, which has the index value of 3.

The online concierge system 102 also evaluates display of a sponsored content item having a standard size (i.e., occupying a single slot) from the root node 740 corresponding to display of no sponsored content items in the directed acyclic graph 700. To perform such an evaluation, the online concierge system 102 identifies a standard sponsored content item having a highest position in the ranking based on content scores for display in slot 725. In the example of FIG. 7, standard sponsored content item 705 is the standard sponsored content item with the highest position in the ranking based on content scores, so node 760 corresponds to displaying standard sponsored content item 705 in slot 725. Node 760 is identified by a pair (1,1), indicating that node 760 corresponds to display of 1 standard sponsored content item and 1 slot being occupied displaying sponsored content items.

Edge 755 connects root node 740 to node 770, with edge 755 identifying the sponsored content item to be displayed in the slot having an index value corresponding to node 770, so in FIG. 7, edge 755 identifies standard sponsored content item 705. Additionally, edge 755 includes a weight corresponding to an expected value of the online concierge system 102 for displaying standard sponsored content item 705 in the slot, slot 725, corresponding to the index value of node 770. As further described above, in FIG. 7, the expected value for edge 765 is a product of the bid amount for standard sponsored content item 705, the content score for standard sponsored content item 705, and the position bias for slot 725, which has the index value of 1.

From node 770, the online concierge system 102 evaluates placement of a sponsored content item in a slot capable of displaying a sponsored content item having an index value subsequent to the slots already displaying sponsored content items. In the example of FIG. 7, node 770 indicates that slot 725, having an index value of 1, is displaying a sponsored content item in node 740, so the online concierge system 102 identifies slot 730, which has the index value of 2, as the next available slot having an index value greater than the index value corresponding to node 770. As slot 730 is adjacent to a sufficient number of slots to display an extended sponsored content item with sizing information occupying two adjacent slots, the online concierge system 102 evaluates placement of an extended sponsored content item in slot 730 and the adjacent slot, slot 735, in which a sponsored content item is not displayed, and evaluates placement of a standard sponsored content item in slot 730.

Node 780 in the directed acyclic graph 700 corresponds to display of a standard sponsored content item having a highest position in the ranking based on content scores that is not already placed in a slot in slot 730. In the example of FIG. 7, standard sponsored content item 710 is the standard sponsored content item with the highest position in the ranking based on content scores that is not placed in a slot, so node 780 corresponds to displaying standard sponsored content item 710 in slot 730. Node 780 is identified by a pair (2,2), indicating that node 780 corresponds to display of 2 standard sponsored content item and 2 slots being occupied displaying sponsored content items.

Edge 775 connects node 770 to node 780, with edge 775 identifying the sponsored content item to be displayed in the slot having an index value corresponding to node 780, so in FIG. 7, edge 775 identifies standard sponsored content item 710. Additionally, edge 775 includes a weight corresponding to an expected value of the online concierge system 102 for displaying standard sponsored content item 710 in the slot, slot 730, corresponding to the index value of node 780. As further described above, in FIG. 7, the expected value for edge 775 is a product of the bid amount for standard sponsored content item 710, the content score for standard sponsored content item 710, and the position bias for slot 730, which has the index value of 2.

Node 790 in the directed acyclic graph 700 corresponds to display of an extended sponsored content item having a highest position in the ranking based on content scores that is not already placed in a slot in slot 730 and a slot adjacent to slot 730 in which a sponsored content item is not displayed. In the example of FIG. 7, extended sponsored content item 715 is the extended sponsored content item with the highest position in the ranking based on content scores that is not placed in a slot, so node 790 corresponds to displaying standard sponsored content item 715 in slot 730 and in adjacent slot 735. Node 790 is identified by a pair (2,3), indicating that node 790 corresponds to display of 2 standard sponsored content item and 3 slots being occupied displaying sponsored content items.

Edge 785 connects node 770 to node 790, with edge 785 identifying the sponsored content item to be displayed in the slot having an index value corresponding to node 790, so in FIG. 7, edge 785 identifies extended sponsored content item 715. Additionally, edge 785 includes a weight corresponding to an expected value of the online concierge system 102 for displaying extended sponsored content item 715 in the slot, slot 730, corresponding to the index value of node 790. As further described above, in FIG. 7, the expected value for edge 785 is a product of the bid amount for extended sponsored content item 715, the content score for extended sponsored content item 715, and the extended position bias for slot 730, which has the index value of 2.

Referring back to FIG. 6, to generate 645 the interface, the online concierge system 102 computes the aggregate expected value for edges along each path through the directed acyclic graph. The online concierge system 102 selects a path through the directed acyclic graph having a maximum expected value and generates 645 the interface by placing selected standard sponsored content items and selected extended content items identified by edges along the selected path in slots corresponding to destination nodes of the edges along the selected path through the directed acyclic graph. As the expected values of edges between nodes in the directed acyclic graph account for both content scores of selected sponsored content items and position biases or extended position biases of slots in which the sponsored content items are displayed, the expected values used to determine placement of selected sponsored content items in different slots account for both the user's likelihood of interacting with a selected sponsored content item and likelihoods of interaction with different slots in which sponsored content items are presented.

Referring to FIG. 7, the online concierge system 102 identifies a first path through the directed acyclic graph 700 traversing edge 745 and edge 765, a second path through the directed acyclic graph 700 traversing edge 755 and edge 775, and a third path through the directed acyclic graph 700 traversing edge 755 and edge 785. The online concierge system 102 determines a first aggregate expected value for the first path by combining the expected values of edge 745 and of edge 765. Similarly, the online concierge system 102 determines a second aggregate expected value for the second path by combining the expected values of edge 755 and of edge 775 and determines a third aggregate expected value for the third path by combining the expected values of edge 755 and of edge 785. To determine placement of the sponsored content items, the online concierge system 102 selects the path having the maximum aggregate expected value and positions sponsored content items in slots of the interface based on the nodes along the selected path. For example, if the first path through the directed acyclic graph 700 has the maximum aggregated expected value, the online concierge system 102 generates the interface by positioning sponsored content items according to node 750 and node 760, which are along the selected path. Hence, in the preceding example, the interface 700 displays extended sponsored content item 715 in slot 725 and in slot 730 and displayed standard sponsored content item 705 in slot 735.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
obtaining sponsored content items including one or more standard sponsored content items at an online concierge system, each standard sponsored content item having sizing information specifying a single slot in an interface generated by the online concierge system and having a bid amount and including one or more extended sponsored content items at the online concierge system, each extended sponsored content item having sizing information specifying multiple adjacent slots in the interface generated by the online concierge system and having the bid amount;
receiving, at the online concierge system, a request for content from a user;
determining a content score for each sponsored content item, the content score for a sponsored content item indicating a likelihood of the user performing an interaction when the sponsored content item is displayed to the user;
determining a position bias for each slot in the interface, the position bias for a slot providing a measure of the user's likelihood of selecting a standard content item displayed in the slot;
determining an extended position bias for each slot in the interface, the extended position bias for the slot providing a measure of the user's likelihood of selecting an extended sponsored content item displayed in the slot and in one or more adjacent slots;
selecting sponsored content items including a candidate standard sponsored content item and a corresponding candidate extended sponsored content item, the candidate standard sponsored content item having a first size and the candidate extended sponsored content item having a second size that is larger than the first size;

ranking the selected sponsored content items based on their content scores;

generating a directed acyclic graph from the selected sponsored content items, the directed acyclic graph comprising a plurality of nodes connected by edges, the directed acyclic graph representing candidate spatial placements of the selected sponsored content items, wherein the directed acyclic graph comprises:

the plurality of nodes corresponding to placements of the selected sponsored content items in the slots of the interface, wherein the plurality of nodes comprise a first node representing a first placement of the candidate standard sponsored content item occupying one or more slots and a second node representing a second placement of the candidate extended sponsored content item occupying more slots than the one or more slots occupied by the candidate standard sponsored content item, and an edge between a starting node and a destination node identifying a particular selected sponsored content item to display in a slot corresponding to the destination node, the particular selected sponsored content item having particular sizing information, not already placed in a different slot, and having a highest position in the ranking, the edge having a weight comprising an expected value of displaying the selected sponsored content item in the slot corresponding to the destination node, the expected value based on the bid amount of the selected sponsored content item, the content score of the selected sponsored content item, and the position bias or the extended position bias of the slot corresponding to the destination node and sizing information of the selected sponsored content item; and generating the interface including one or more of the sponsored content items in slots determined by nodes and edges along a path through the directed acyclic graph selected based on aggregated expected values of edges along the path.

2. The method of claim 1, wherein generating the interface including one or more of the sponsored content items in slots determined by nodes along the path through the directed acyclic graph selected based on aggregated expected values of edges along the path comprises:

identifying each path from a root node through the directed acyclic graph;

determining an aggregated expected value of each identified path by aggregating the expected value of each edge along an identified path;

selecting an identified path having a maximum aggregated expected value; and generating the interface to display sponsored content items identified by edges along the selected identified path in slots corresponding to nodes along the selected identified path.

3. The method of claim 1, wherein the expected value of displaying the selected sponsored content item in the slot corresponding to the destination node comprises a product of: the bid amount of the selected sponsored content item, the content score of the selected sponsored content item, and the position bias of the slot corresponding to the destination node in response to the selected sponsored content item being a standard sponsored content item.

4. The method of claim 1, wherein the expected value of displaying the selected sponsored content item in the slot corresponding to the destination node comprises a product of: the bid amount of the selected sponsored content item, the content score of the selected sponsored content item, and the extended position bias of the slot corresponding to the destination node in response to the selected sponsored content item being an extended sponsored content item.

5. The method of claim 1, wherein the selected sponsored content item to display in the slot corresponding to the destination node satisfies one or more layout constraints enforced by the online concierge system.

6. The method of claim 5, wherein a layout constraint is selected from a group consisting of: an extended sponsored content item being displayed in adjacent slots in a common row of the interface, the extended sponsored content item being displayed in adjacent slots in a common column of the interface, the extended sponsored content item being displayed in a slot having an adjacent slot in which a sponsored content item is capable of being displayed, the sponsored content item is not displayed in a slot that is indicated as ineligible to display a sponsored content item, and any combination thereof.

7. The method of claim 1, wherein determining the position bias for each slot in the interface comprises:

determining the position bias for the slot based on a frequency with which users of the online concierge system interacted with content items displayed in only the slot.

8. The method of claim 1, wherein determining the extended position bias for each slot in the interface comprises:

determining the position bias for the slot based on a frequency with which users of the online concierge system interacted with extended content items that are displayed in the slot and in another slot adjacent to the slot.

9. The method of claim 1, wherein the extended content item is displayed in two adjacent slots of the interface.

10. The method of claim 9, wherein the extended content item is displayed in two horizontally adjacent slots in a common row of the interface.

11. A computer program product comprising a non-transitory computer readable storage medium having instructions encoded thereon that, when executed by a processor, cause the processor to:

obtain sponsored content items including one or more standard sponsored content items at an online concierge system, each standard sponsored content item having sizing information specifying a single slot in an interface generated by the online concierge system and having a bid amount and including one or more extended sponsored content items at the online concierge system, each extended sponsored content item having sizing information specifying multiple adjacent slots in the interface generated by the online concierge system and having the bid amount;

receive, at the online concierge system, a request for content from a user;

determine a content score for each sponsored content item, the content score for a sponsored content item indicating a likelihood of the user performing an interaction when the sponsored content item is displayed to the user;

determine a position bias for each slot in the interface, the extended position bias for a slot providing a measure of the user's likelihood of selecting a standard content item displayed in the slot;

determine an extended position bias for each slot in the interface, the position bias for the slot providing a measure of the user's likelihood of selecting an extended content item displayed in the slot and in one or more adjacent slots;

select sponsored content items including a candidate standard sponsored content item and a corresponding candidate extended sponsored content item, the candidate standard sponsored content item having a first size and the candidate extended sponsored content item having a second size that is larger than the first size;

rank the selected sponsored content items based on their content scores;

generate a directed acyclic graph from the selected sponsored content items, the directed acyclic graph comprising a plurality of nodes connected by edges, the directed acyclic graph representing candidate spatial placements of the selected sponsored content items, wherein the directed acyclic graph comprises:

the plurality of nodes corresponding to placements of the selected sponsored content items in the slots of the interface, wherein the plurality of nodes comprise a first node representing a first placement of the candidate standard sponsored content item occupying one or more slots and a second node representing a second placement of the candidate extended sponsored content item occupying more slots than the one or more slots occupied by the candidate standard sponsored content item, and an edge between a starting node and a destination node identifying a selected sponsored content item to display in a slot corresponding to the destination node, the selected sponsored content item having particular sizing information, not already placed in a different slot, and having a highest position in the ranking, the edge having a weight comprising an expected value of displaying the selected sponsored content item in the slot corresponding to the destination node, the expected value based on the bid amount of the selected sponsored content item, the content score of the selected sponsored content item, and the position bias or the extended position bias of the slot corresponding to the destination node and sizing information of the selected sponsored content item; and generate the interface including one or more of the sponsored content items in slots determined by nodes and edges along a path through the directed acyclic graph selected based on aggregated expected values of edges along the path.

12. The computer program product of claim 11, wherein generate the interface including one or more of the sponsored content items in slots determined by nodes along the path through the directed acyclic graph selected based on aggregated expected values of edges along the path comprises:

identify each path from a root node through the directed acyclic graph;

determine an aggregated expected value of each identified path by aggregating the expected value of each edge along an identified path;

select an identified path having a maximum aggregated expected value; and generate the interface to display sponsored content items identified by edges along the selected identified path in slots corresponding to nodes along the selected identified path.

13. The computer program product of claim 11, wherein the expected value of displaying the selected sponsored content item in the slot corresponding to the destination node comprises a product of: the bid amount of the selected sponsored content item, the content score of the selected sponsored content item, and the position bias of the slot corresponding to the destination node in response to the selected sponsored content item being a standard sponsored content item.

14. The computer program product of claim 11, wherein the expected value of displaying the selected sponsored content item in the slot corresponding to the destination node comprises a product of: the bid amount of the selected sponsored content item, the content score of the selected sponsored content item, and the extended position bias of the slot corresponding to the destination node in response to the selected sponsored content item being an extended sponsored content item.

15. The computer program product of claim 11, wherein the selected sponsored content item to display in the slot corresponding to the destination node satisfies one or more layout constraints enforced by the online concierge system.

16. The computer program product of claim 15, wherein a layout constraint is selected from a group consisting of: an extended sponsored content item being displayed in adjacent slots in a common row of the interface, the extended sponsored content item being displayed in adjacent slots in a common column of the interface, the extended sponsored content item being displayed in a slot having an adjacent slot in which a sponsored content item is capable of being displayed, the sponsored content item is not displayed in a slot that is indicated as ineligible to display a sponsored content item, and any combination thereof.

17. The computer program product of claim 11, wherein determine the position bias for each slot in the interface comprises:

determine the position bias for the slot based on a frequency with which users of the online concierge system interacted with content items displayed in only the slot.

18. The computer program product of claim 11, wherein determine the extended position bias for each slot in the interface comprises:

determine the position bias for the slot based on a frequency with which users of the online concierge system interacted with extended content items that are displayed in the slot and in another slot adjacent to the slot.

19. The computer program product of claim 11, wherein the extended content item is displayed in two adjacent slots of the interface.

20. A system comprising:

one or more processors; and memory configured to store code comprising instructions, wherein the instructions, when executed by the one or more processors, cause the one or more processors to:

obtain sponsored content items including one or more standard sponsored content items at an online concierge system, each standard sponsored content item having sizing information specifying a single slot in an interface generated by the online concierge system and having a bid amount and including one or more extended sponsored content items at the online concierge system, each extended sponsored content item having sizing information specifying multiple adjacent slots in the interface generated by the online concierge system and having the bid amount;

receive, at the online concierge system, a request for content from a user;

determine a content score for each sponsored content item, the content score for a sponsored content item indicating a likelihood of the user performing an interaction when the sponsored content item is displayed to the user;

determine a position bias for each slot in the interface, the extended position bias for a slot providing a measure of the user's likelihood of selecting a standard content item displayed in the slot;

determine an extended position bias for each slot in the interface, the position bias for the slot providing a measure of the user's likelihood of selecting an extended content item displayed in the slot and in one or more adjacent slots;

select sponsored content items including a candidate standard sponsored content item and a corresponding candidate extended sponsored content item, the candidate standard sponsored content item having a first size and the candidate extended sponsored content item having a second size that is larger than the first size;

rank the selected sponsored content items based on their content scores;

generate a directed acyclic graph from the selected sponsored content items, the directed acyclic graph comprising a plurality of nodes connected by edges, the directed acyclic graph representing candidate spatial placements of the selected sponsored content items, wherein the directed acyclic graph comprises:

the plurality of nodes corresponding to placements of the selected sponsored content items in the slots of the interface, wherein the plurality of nodes comprise a first node representing a first placement of the candidate standard sponsored content item occupying one or more slots and a second node representing a second placement of the candidate extended sponsored content item occupying more slots than the one or more slots occupied by the candidate standard sponsored content item, and an edge between a starting node and a destination node identifying a selected sponsored content item to display in a slot corresponding to the destination node, the selected sponsored content item having particular sizing information, not already placed in a different slot, and having a highest position in the ranking, the edge having a weight comprising an expected value of displaying the selected sponsored content item in the slot corresponding to the destination node, the expected value based on the bid amount of the selected sponsored content item, the content score of the selected sponsored content item, and the position bias or the extended position bias of the slot corresponding to the destination node and sizing information of the selected sponsored content item; and generate the interface including one or more of the sponsored content items in slots determined by nodes and edges along a path through the directed acyclic graph selected based on aggregated expected values of edges along the path.

* * * * *